Dec. 30, 1952 P. H. THOMPSON 2,623,778
END GATE FOR PICKUP TRUCKS
Filed Oct. 17, 1951
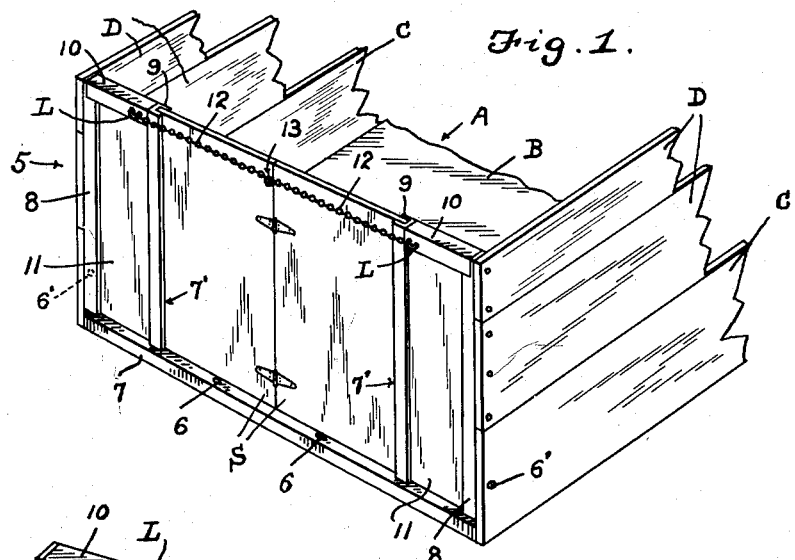
Fig. 1.
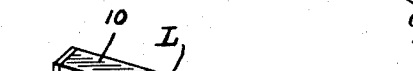
Fig. 2.
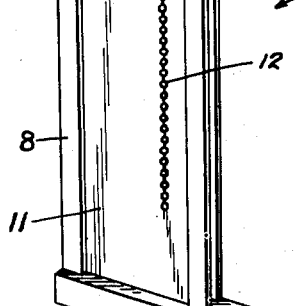
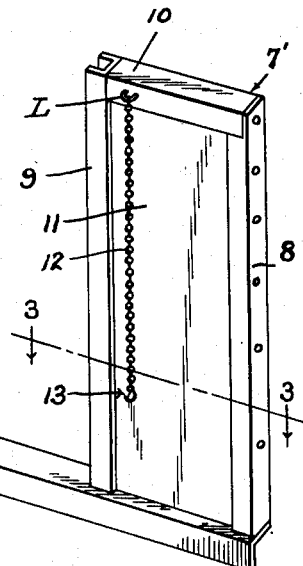
Fig. 3.
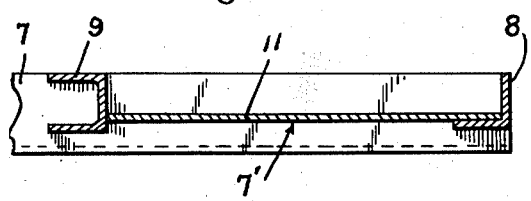
INVENTOR
Paul H. Thompson
BY L. B. James
ATTORNEY Patented Dec. 30, 1952

2,623,778

UNITED STATES PATENT OFFICE 2,623,778

ENDGATE FOR PICKUP TRUCKS

Paul H. Thompson, Clearwater, Nebr.

Application October 17, 1951, Serial No. 251,677

1 Claim. (Cl. 296—52)

This invention relates to the official class of land vehicles and more particularly a new and novel end gate for pick-up trucks.

One of the objects of this invention resides in the provision of an end gate adapted to be constructed in the form of a prefabricated unit to be secured to the rear ends of pick-up trucks provided with built up bodies.

Another object of this invention resides in the combination of the end gate unit and removable hinged panel or other suitable closure therefor.

A further object of this invention resides in the particular construction of the end gate unit.

A still further object of this invention resides in the provision of an end gate unit for pick-up trucks adapted to retain the built up bodies thereon in true and rigid relation to the truck bodies at all times and under all road conditions.

With these and other objects in view this invention resides in certain novel features of construction and arrangement of elements to be hereinafter more particularly set forth in the specification, illustrated in the accompanying drawing and pointed out in the appended claim and, although this disclosure depicts my present conception of the invention, the right is reserved to resort to such departures therefrom as come within the scope of the claim.

In the accompanying drawing forming a part of this application:

Fig. 1 is a perspective view of the rear end portion of a pick-up truck showing the end gate unit secured thereto.

Fig. 2 is a similar view of the end gate unit per se.

Fig. 3 is an enlarged sectional view taken approximately on line 3—3 of Fig. 2.

In the present illustration of this invention the letter A designates the rear end portion of a conventional pick-up truck which, among other well known elements, consists of a bottom B and sides C and built up body D rigidly secured thereto while the numeral 5 designates, in general, a prefabricated end gate unit secured to the rear end of the pick-up truck by bolts 6 or other well known fastening means.

The aforesaid end gate unit consists of an angle-iron sill 7 on the ends of which is rigidly secured, as by welding or other suitable means, opposed wings 7' which are herein shown as being of a height greater than the sides C of the pick-up truck to the upper portions of which are secured the rear ends of the built up body so as to increase the capacity of the truck.

Each of the wings of the end gate unit is formed of a vertical outer angle-iron standard 8 and inner channel-iron standard 9 connected at their upper ends by an angle-iron cross piece 10 with the space therebetween closed by a panel 11 formed of suitable gage metal or other selected material. Said members forming the aforesaid wings are welded together to provide rigid and strong supports for a hinged panel S or other suitable closure removably disposed in the opposed channel-iron standards 9 when it is necessary to close the entire rear end of the pick-up truck. Opposed chains 12 having their inner ends connected to loops L on the outer or rear sides of the wings with their outer ends connected across the opening between the inner ends of the wings by a suitable clamp 13 or other desired fastening elements to prevent the wings from lateral spreading.

In rigidly securing the end gate unit to the rear end of the pick-up truck, the sill is disposed over the outer edge of the bottom of the pick-up truck by certain of the aforesaid bolts 6 and thereby protects the same against damage while the wings are secured to the sides of the pick-up truck by other bolts 6' thus providing load retaining means at the rear of the pick-up truck or other type of truck, wagon or the like which will not only retain the built up body in true and rigid relation to the same but will promote the utility of standard pick-up trucks.

With this invention fully set forth, it is manifest that a prefabricated end gate for pick-up trucks, wagons and the like is provided and, through the instrumentality of the simple construction thereof, it can be cheaply manufactured and sold at a reasonable cost.

Having thus described my invention, what I claim and desire to protect by Letters Patent is:

A prefabricated end gate for pick-up trucks having built up bodies thereon comprising a laterally extending angle-iron sill, angle-iron standards rigidly secured to the sill at its ends and rigidly supporting the rear ends of the built up bodies, channel-iron standards rigidly secured to the sill in spaced relation to the angle-iron standards, laterally extending angle-iron cross members securing the upper ends of the angle-iron standards and channel-iron standards rigidly together, sheet metal panels connecting the angle-iron and channel-iron standards together and closing the spaces therebetween, chains secured at their inner ends to the rear sides of the opposite crosspieces, and means connecting the free ends of the chains together when extended across the opening between the channel-iron standards.

PAUL H. THOMPSON.

REFERENCES CITED

The following references are of record in the file of this patent:

UNITED STATES PATENTS

| Number | Name | Date |
|---|---|---|
| 314,154 | Swenson | Mar. 17, 1885 |
| 1,191,569 | Corbit | July 18, 1916 |
| 1,311,644 | Flom | July 29, 1919 |
| 1,326,233 | Vaught | Dec. 30, 1919 |
| 1,632,747 | Nash et al. | June 14, 1927 |
| 1,759,323 | Persinger | May 20, 1930 |
| 1,807,084 | Chevrier | May 26, 1931 |